United States Patent [19]

Burolla

[11] Patent Number: 5,297,336
[45] Date of Patent: Mar. 29, 1994

[54] PROCESS FOR MAKING AN INK MANIFOLD HAVING ELASTOMER CHANNEL PLATE FOR INK JET PRINTHEAD

[75] Inventor: Vincent A. Burolla, Ontario, N.Y.

[73] Assignee: Xerox Corporation, Stamford, Conn.

[21] Appl. No.: 92,644

[22] Filed: Jul. 16, 1993

Related U.S. Application Data

[62] Division of Ser. No. 862,393, Apr. 2, 1992, Pat. No. 5,255,022.

[51] Int. Cl.$^5$ .................. B29C 45/00; B29C 65/02; B41J 2/16
[52] U.S. Cl. .................. 29/890.1; 29/527.1; 29/611; 264/249; 264/250; 264/328.8
[58] Field of Search .......... 29/25.35, 527.1, 527.3, 29/611, 890.1; 156/242, 245, 272.2; 264/249, 250, 255, 328.2, 328.8, 328.7; 346/140 R, 1.1

[56] References Cited

U.S. PATENT DOCUMENTS

| Re. 32,572 | 1/1988 | Hawkins et al. | 156/626 |
|---|---|---|---|
| 4,251,824 | 2/1981 | Hara et al. | 346/140 R |
| 4,304,749 | 12/1981 | Bauer | 264/250 X |
| 4,330,787 | 5/1982 | Sato et al. | 346/140 R |
| 4,352,772 | 10/1982 | Bezner | 264/250 X |
| 4,463,359 | 1/1984 | Ayata et al. | 346/1.1 |
| 4,492,966 | 1/1985 | Seki et al. | 346/33 A |
| 4,536,777 | 8/1985 | Matsumoto | 346/140 R |
| 4,635,073 | 1/1987 | Hanson | 346/1.1 |
| 4,727,012 | 2/1988 | Quella et al. | 430/320 |
| 4,774,530 | 9/1988 | Hawkins | 346/140 R |
| 4,786,357 | 11/1988 | Campanelli et al. | 156/633 |
| 4,833,491 | 5/1989 | Rezanka | 346/140 R |
| 4,866,461 | 9/1989 | Piatt | 346/140 R |
| 5,008,060 | 4/1991 | Kanai et al. | 264/255 |
| 5,017,941 | 5/1991 | Drake | 346/1.1 |
| 5,218,754 | 6/1993 | Rangappan | 29/611 |

FOREIGN PATENT DOCUMENTS 4-131244  5/1992  Japan ..................... 29/890.1

OTHER PUBLICATIONS

Lane, R. IBM Technical Disclosure Bulletin, vol. 17, No. 5, pp. 1525–1526, Oct. 1974.

Primary Examiner—Mark Rosenbaum
Assistant Examiner—S. Thomas Hughes
Attorney, Agent, or Firm—Oliff & Berridge

[57] ABSTRACT

An ink manifold is integrally formed with an elastomeric channel plate by a two-step injection molding process. The manifold can include posts for attachment to a heat sink upon which is secured a heater plate containing a plurality of heater elements which are located in corresponding channels of the elastomeric channel plate. The elastomeric channel plate eliminates the need to secure the channel plate to the manifold and heater plate using adhesives.

8 Claims, 6 Drawing Sheets

| S101 | FORM CHANIFOLD |
|---|---|
| S102 | FORM HEATER WAFER |
| S103 | DICE HEATER WAFER |
| S104 | ULTRASONICALLY CLEAN HEATER WAFER |
| S105 | SINGULATE HEATER WAFER TO FORM DISTINCT HEATER PLATES |
| S106 | APPLY ADHESIVE TO HEAT SINK |
| S107 | MOUNT HEATER PLATE TO HEAT SINK |
| S108 | CURE ADHESIVE BOND |
| S109 | APPLY PWB TO HEAT SINK |
| S100 | WIRE BOND HEATER PLATE TO PWB |
| S111 | ALIGN CHANIFOLD TO HEATER PLATE |
| S112 | INSERT POST INTO HEAT SINK |
| S113 | SECURE CHANIFOLD TO HEAT SINK |

| S1 | FORM MANIFOLD |
|---|---|
| S2 | FORM HEATER WAFER |
| S3 | FORM CHANNEL WAFER |
| S4 | APPLY ADHESIVE TO CHANNEL WAFER |
| S5 | INFRARED ALIGN WAFERS AND TACK |
| S6 | PARTIAL CURE WAFER ASSEMBLY |
| S7 | DICE WAFER ASSEMBLY |
| S8 | ULTRASONICALLY CLEAN WAFER ASSEMBLY |
| S9 | SINGULATE WAFER ASSEMBLY TO FORM DISTINCT PRINTHEAD MODULES |
| S10 | COAT MODULE FRONT FACE. FINAL CURE ADHESIVES |
| S11 | APPLY ADHESIVE TO HEAT SINK |
| S12 | MOUNT MODULE TO HEAT SINK |
| S13 | CURE ADHESIVE BOND |
| S14 | APPLY PWB TO HEAT SINK |
| S15 | WIRE BOND PRINTHEAD MODULE TO PWB |
| S16 | APPLY MANIFOLD SEAL |
| S17 | ATTACH MANIFOLD TO MODULE |
| S18 | SECURE MANIFOLD TO HEAT SINK |

FIG.1

PRIOR ART

| | |
|---|---|
| S101 | FORM CHANIFOLD |
| S102 | FORM HEATER WAFER |
| S103 | DICE HEATER WAFER |
| S104 | ULTRASONICALLY CLEAN HEATER WAFER |
| S105 | SINGULATE HEATER WAFER TO FORM DISTINCT HEATER PLATES |
| S106 | APPLY ADHESIVE TO HEAT SINK |
| S107 | MOUNT HEATER PLATE TO HEAT SINK |
| S108 | CURE ADHESIVE BOND |
| S109 | APPLY PWB TO HEAT SINK |
| S100 | WIRE BOND HEATER PLATE TO PWB |
| S111 | ALIGN CHANIFOLD TO HEATER PLATE |
| S112 | INSERT POST INTO HEAT SINK |
| S113 | SECURE CHANIFOLD TO HEAT SINK |

FIG.7

PROCESS FOR MAKING AN INK MANIFOLD HAVING ELASTOMER CHANNEL PLATE FOR INK JET PRINTHEAD

This is a division of application Ser. No. 07/862,393 filed Apr. 2, 1992, now U.S. Pat. No. 5,255,022.

BACKGROUND OF THE INVENTION

1. Field of the Invention

The present invention is directed to ink jet printheads, and in particular to ink jet printheads having an ink manifold and channel plate, and to methods of making manifolds and channel plates for ink jet printheads.

2. Description of the Related Art

Generally speaking, drop-on-demand ink jet printing systems can be divided into two types. The type using a piezoelectric transducer to produce a pressure pulse that expels a droplet from a nozzle or the type using thermal energy to produce a vapor bubble in an ink-filled channel that expels a droplet. This latter type is referred to as thermal ink jet printing or bubble ink jet printing. In existing thermal ink jet printing, the printhead comprises one or more ink filled channels, such as disclosed in U.S. Pat. No. 4,463,359 to Ayata et al, (the disclosure of which is incorporated herein by reference) communicating with a relatively small ink supply chamber at one end and having an opening at the opposite end, referred to as a nozzle. A thermal energy generator, usually a resistor, is located in the channels near the nozzle a predetermined distance therefrom. The resistors are individually addressed with a current pulse to momentarily vaporize the ink and form a bubble which expels an ink droplet. As the bubble grows, the ink bulges from the nozzle and is contained by the surface tension of the ink as a meniscus. As the bubble begins to collapse, the ink still in the channel between the nozzle and bubble starts to move towards the collapsing bubble, causing a volumetric contraction of the ink at the nozzle and resulting in the separating of the bulging ink as a droplet. The acceleration of the ink out of the nozzle while the bubble is growing provides the momentum and velocity of the droplet in a substantially straight line direction towards a recording medium, such as paper.

In U.S. Pat. No. 4,463,359, a thermal ink jet printer is disclosed having one or more ink-filled channels which are replenished by capillary action. A meniscus is formed at each nozzle to prevent ink from weeping therefrom. A resistor or heater is located in each channel at a predetermined distance from the nozzles. Current pulses representative of data signals are applied to the resistor to momentarily vaporize the ink in contact therewith and form a bubble for each current pulse. Ink droplets are expelled from each nozzle by the growth of the bubbles which causes a quantity of ink to bulge from the nozzle and break off into a droplet at the beginning of the bubble collapse. The current pulses are shaped to prevent the meniscus from breaking up and receding too far into the channels after each droplet is expelled. Various embodiments of linear arrays of thermal ink jet devices are shown such as those having staggered linear arrays attached to the top and bottom of a heat sinking substrate and those having different colored inks for multicolored printing. In one embodiment, a resistor is located in the center of a relatively short channel having nozzles at both end thereof. Another passageway is connected to the open-ended channel and is perpendicular thereto to form a T-shaped structure. Ink is replenished to the open-ended channel from the passageway by capillary action. Thus, when a bubble is formed in the open-ended channel, two different recording mediums may be printed simultaneously.

One preferred technique for fabricating thermal ink jet printheads is disclosed in U.S. Pat. No. Re. 32,572 to Hawkins et al (the disclosure of which is incorporated herein by reference). Each printhead is composed of two parts aligned and bonded together. One part (known as a heater plate) is a substantially flat substrate which contains on the surface thereof a linear array of heating elements and addressing electrodes, and the second part (known as a channel plate) is a substrate having at least one recess anisotropically etched therein to serve as an ink supply reservoir when the two parts are bonded together. A linear array of parallel grooves are formed in the second part, so that one end of the grooves communicate with the reservoir recess and the other ends are open for use as ink droplet expelling nozzles. Many printheads can be made simultaneously by producing a plurality of sets of heating element arrays (heater plates) with their addressing electrodes on a silicon wafer and by placing alignment marks thereon at predetermined locations. A corresponding plurality of sets of channels and associated reservoirs (channel plates) are produced in a second silicon wafer and, in one embodiment, alignment openings are etched thereon at predetermined locations. The two wafers are aligned via the alignment openings and alignment marks, then bonded together and diced into many separate printhead modules. A number of printhead modules can be fixedly mounted in a pagewidth configuration which confronts a moving recording medium for pagewidth printing. Alternatively, individual printhead modules can be used to form carriage type printheads as shown in FIG. 1 of U.S. Pat. No. Re. 32,572.

These printheads are typically mounted on a heat sink so that the heater plate is in physical contact with the heat sink. The individual addressing electrodes are then wire bonded to corresponding electrodes in a printed wire board (see FIGS. 2-4 of U.S. Pat. No. Re. 32,572). An ink manifold is typically sealed to a surface of the channel plate opposite from the surface containing the channels so that ink contained in an ink supply can be supplied to the reservoir in the channel plate through the ink manifold.

These ink manifolds can be made from a hard plastic material by a one step injection molding process.

FIG. 1 is a block diagram of a conventional process for fabricating thermal ink jet printheads such as the printhead shown in FIG. 2. A hard plastic manifold 18 is injection molded (S1) and heater and channel plates 12, 15, respectively are fabricated in silicon wafers (S2, S3). The heater and channel wafers are infrared aligned and an epoxy 13 is used to adhesively bond channel plates 15 of the channel wafer to heater plates 12 of the heater wafer to form a wafer assembly (S4, S5, S6). The wafer assembly is diced into many individual printhead modules 17 by using a dicing blade, the wafer assembly is ultrasonically cleaned, and then individual printhead modules 17 are separated from the diced wafer assembly (S7-S9). For more details on this fabrication process see, for example, U.S. Pat. No. 4,786,357 to Campanelli et al.

After the nozzle-containing front face of each printhead module is coated with a hydrophobic substance, the adhesive bonding each channel plate to each corresponding heater plate is totally cured (S10). Printhead modules 17 can then be used to make either a carriage type or a full-width thermal ink jet printhead. A full-width thermal ink jet printhead is formed as either a butted array or a staggered array of individual printhead modules, while only one diced printhead module is required to form a carriage type printhead (although plural printhead modules can be stacked to improve resolution or provide for multiple colors in carriage-type printheads as disclosed in U.S. Pat. No. 4,833,491 to Rezanka).

As shown in FIG. 2, printhead module 17 (shown with its subparts) is bonded to manifold 18 and heat sink 16 to complete the fabrication of the thermal ink jet printhead. An adhesive 14, such as, for example, silver epoxy, is applied to heat sink 16, and the printhead module 17 is bonded to heat sink 16 by curing adhesive 14 (S11–S13). A printed wire board (PWB) is applied to the heat sink (S14), and is wire-bonded to the addressing electrodes of the heater plate (S15). Finally, manifold 18 is sealed to printhead module 17 by using, for example, an RTV sealant 19, and manifold 18 is then secured to heat sink 16, also with epoxy (S16–S18).

The above fabrication method is disadvantageous because: (1) precise alignment and dicing of the wafer assembly is difficult; (2) the use of adhesive 13 to bond channel plate 15 to heater plate 12 increases the likelihood that the channels will become clogged by the adhesive during fabrication; and (3) the total process is time consuming and cost inefficient due to the numerous fabrication steps, and careful adhesion application process involved.

U.S. Pat. No. 4,866,461, to Piatt discloses a top shooter printhead of a carriage type. A print cartridge comprises a base member having an opening and a heater/electrode access slit. The base member can be formed of molded plastic and can include ink channeling structures extending from the opening to the slit. By virtue of its material composition, the base member provides easy attachment of other components that cooperate to form the print cartridge. An ink supply housing is attached to the base member by bonding or mechanically coupling its opening to the base member. Further, a cover member is bonded to a face of the base member opposite from the ink supply housing. The cover member can be formed of molded plastic and have nozzle-defining apertures therein. Alternatively, the cover can be molded as part of the base member, and a separate orifice plate can be attached to the base member opposite to the slit. The heater/electrode can be secured into the slit, for example, by epoxy bonding, with heating elements approximately flush with the inner surface of the base member.

U.S. Pat. No. 4,635,073 to Hanson discloses a top shooter printhead for insertion into a cartridge. A plastic header is made from an injection molding process, and includes a central ink storage region for receiving ink and feeding the ink into an elongated slot of a thin film resistor substrate. The elongated slot serves as an ink intake port for providing ink to a plurality of ink reservoirs and to corresponding ink injection orifices in an orifice plate.

U.S. Pat. No. 4,727,012 to Quella et al. discloses a side shooter printhead of an ink jet printer. An ink jet chamber is manufactured by an injection molding method. The ink channel and the discharge openings, i.e., nozzles, are manufactured by a multilayer structure composed of a plurality of individual photoplastic films.

U.S. Pat. No. 4,330,787 to Sato et al. discloses the construction of a liquid jet recording device. The liquid jet recording device comprises a plurality of grooves formed in a liquid feeding path plate at positions corresponding to each of a plurality of heat generating elements contained on a heater plate; and a plurality of grooves formed in a liquid discharge path plate at positions corresponding to the grooves. The plates for the liquid feeding path and liquid discharge path may be made of glass, ceramics and, depending on the circumstances, various plastics having heat resistant properties. A manifold is also provided for supplying ink to the grooves in the liquid discharge path plate.

U.S. Pat. No. 4,536,777 to Matsumoto discloses a side shooter printhead of a liquid jet recording apparatus. A liquid jet section comprises a base plate of Fotoceram in which an orifice, a liquid path and an air vent are etched; and a stainless steel top plate having an etched opening in which the energy generating element is to be mounted. The base plate, top plate and the energy generating element are assembled into a unit by the use of any suitable adhesive. A box-like member defines a liquid chamber and is closed at its top opening by a closure which may be injection molded from a thermoplastic resin and adhesively bonded to the top opening. The liquid jet section is then assembled into the box-like member to form a recording head.

None of the above U.S. patents discloses a thermal ink jet printhead having an elastomer channel plate, or injection molding a channel plate into a manifold. Further, none of the above U.S. patents discloses a heater plate and a channel plate assembled to each other without the use of adhesive to secure the channel plate to the heater plate.

The above references are incorporated by reference herein where appropriate for appropriate teachings of additional or alternative details, features and/or technical background.

U.S. patent application Ser. No. 07/789,490 to Anikara Rangappan filed Nov. 8, 1991, now abandoned, and entitled "A Method of Manufacturing Page Wide Thermal Ink-Jet Heads" discloses full-width channel plates formed by injection molding techniques. The channel plates are molded from ceramic "Green Tape" or a hard plastic molding material such as polysulfone.

OBJECTS AND SUMMARY OF THE INVENTION

It is an object of the present invention to provide an ink jet printhead having channels which will not be clogged by adhesives during fabrication.

It is another object of the present invention to provide an ink jet printhead having a reduced fabrication cost.

It is a further object of the present invention to provide an ink jet printhead having a reduced fabrication and assembly time.

To achieve the foregoing and other objects and advantages, and to overcome the shortcomings discussed above, an ink manifold and channel plate are fabricated using a two-step injection molding process. Preferably, the ink manifold is fabricated from a hard plastic material, and the channel plate is fabricated from an elastomeric material so that sealants are not required between the channel plate and the manifold and heater plate. That it, the elastomeric channel plate self-seals to the manifold and to the heater plate.

The combined manifold/channel plate can be used in a variety of ink jet printheads including drop-on-demand thermal ink jet printheads and piezoelectric ink jet printheads, and ink jet printheads which utilize electrostatic attraction to selectively deflect droplets from a continuous stream of droplets into a gutter in order to mark a printing medium with the non-deflected droplets. Printheads made from the combined manifold/channel plate can be used in carriage-type printheads or fullwidth staggered array printheads.

When fabricating thermal ink jet printheads according to the present invention, a plurality of heater plates are fabricated in, for example, a silicon wafer in a conventional manner. The individual heater plates are then separated (for example, by dicing) from the silicon wafer without first adhering the silicon wafer to another silicon wafer containing a plurality of channel plates. Each discrete heater plate is then attached to a heat sink in a conventional manner. The integral manifold/channel plate (also referred to as a chanifold) is then aligned with the heater plate so that each heater element on the heater plate is associated with a corresponding channel in the channel plate. Securement elements on the chanifold are then attached to the heat sink so that the channel plate and heater plate contact and are sealed with each other.

The total number of steps required is substantially less than was required in previous ink jet fabrication processes.

The present invention is applicable to any type of ink jet printhead having channel plates which are attached to an ink manifold. That is, actuating means for ejecting ink droplets from channels other than thermal resistive elements can also be used in the present invention.

BRIEF DESCRIPTION OF THE DRAWINGS

The invention will be described in detail with reference to the following drawings in which like reference numerals refer to like elements, and wherein:

FIG. 1 is a block diagram of a conventional process for fabricating thermal ink jet printheads;

FIG. 7 is a block diagram of a process for fabricating thermal ink jet printheads in accordance with an embodiment of the present invention;

DETAILED DESCRIPTION OF THE PREFERRED EMBODIMENTS

Figure 3:
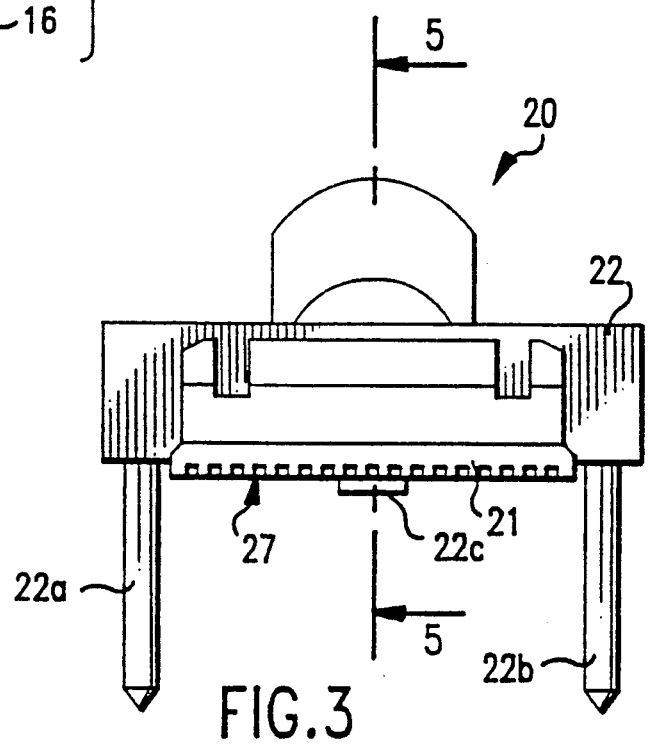
FIG. 3 is a front view of a chanifold according to one embodiment of the present invention.
Figure 4:
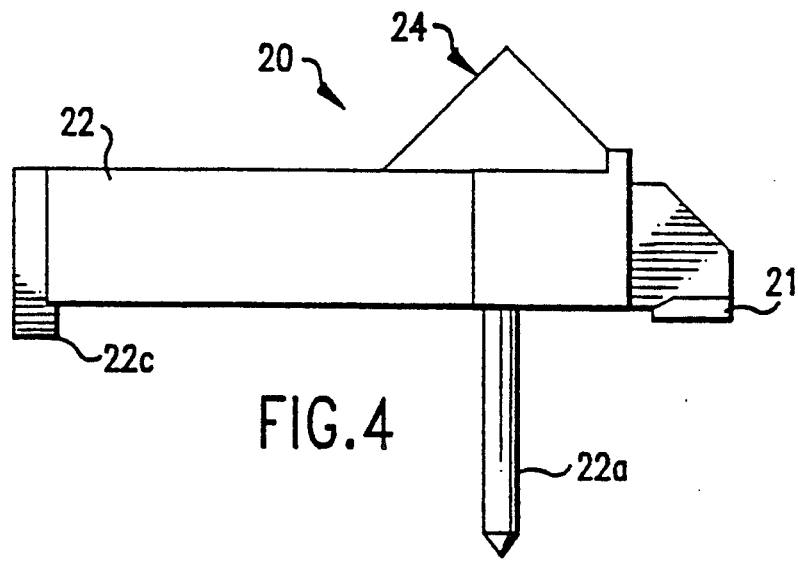
FIG. 4 is a side view of the FIG. 3 chanifold.
Figure 5:
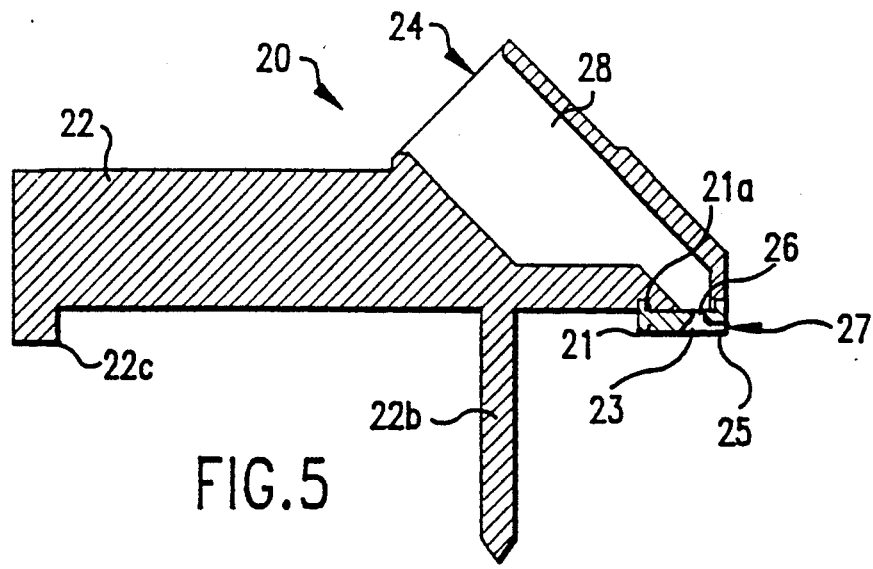
FIG. 5 is a cross-sectional view of the chanifold along the line 5—5 of FIG. 3.

FIGS. 3-5 illustrate various views of an injection molded ink manifold 22 having a channel plate 21 injection molded therein to form a chanifold 20 according to an illustrative embodiment of the present invention. Manifold 22 has an ink inlet 24 for receiving ink from an external ink supply (not shown) and an ink outlet 26 for providing ink to channel plate 21. An ink passage 28 in ink manifold 22 places ink inlet 24 in fluid communication with ink outlet 26. Further, manifold 22 includes two posts 22a, 22b which act as a means for securing chanifold 20 onto a heat sink. Manifold 22 also includes a support post 22c, the function of which will be described below. Manifold 22 is preferably made of a hard plastic material such as, for example, Polysulfone ® (Union Carbide), Ultem ® (General Electric) or a suitable liquid crystal polymer.

Channel plate 21 is injection molded into manifold 22 adjacent to ink outlet 26. Channel plate 21 can have a conventional structure for channel plates, and includes an open recess forming a reservoir 23 on one surface for receiving ink from ink outlet 26 of manifold 22. Reservoir 23 is connected to a plurality of channels 25 which direct the ink to nozzles 27 formed at the ends of channels 25. Channel plate 21 is preferably made from an elastomeric material such as olefinic thermoplastic elastomers such as, for example, Kraton ® (Shell Chemical).

A double injection molding process is used to fabricate chanifold 20. Double injection molding processes are well known, and thus will only be described briefly. An injection molding process involves forcefully injecting (via a leadscrew or hydraulic or electric ram) a hot molten polymer resin into a split die or mold, which has been clamped together. The split die has a cavity or group of cavities which have been machined out of hardened tool steel plates to form negative impressions of the parts (i.e., manifold 22 and channel plate 21) to be molded. A programmable controller automatically controls the various mechanical attachment features, heating and cooling lines, process control sensors, injector and alignment pins and gating devices used during the injection molding process, as is well known.

In order to fabricate chanifold 20, two distinct molding cycles occur with two melts of different composition, respectively, for manifold 22 and channel plate 21. In the first molding cycle, a cast of channel plate 21 is inserted into the negative impression of the split die. As mentioned earlier, typically, hydraulic cylinders clamp the split die to form a mold. A hot molten plastic, such as, for example, Polysulfone ®, is then forcibly injected into the mold.

In order to control the flow of the hot molten plastic within the mold, the mold can be rotated and/or translated between two different injector systems in a conventional manner. Further, internal gates and external valvings of the mold can be opened or closed to steer the hot molten plastic to the negative impression of manifold 22. The internal gates and external valvings can also facilitate the heating and cooling of the molten plastic and the maintenance of proper clamping pressure by the hydraulic cylinders. The cast of channel plate 21 located within the mold prevents the molten plastic for the manifold from flowing into the areas where channel plate 21 will be formed. The high temperature mold and the hot molten plastic are cooled to form hard plastic manifold 22. Then the cast of channel plate 21 is removed.

During the second molding cycle, preferably a molten elastomer, such as, for example, Kraton ®, is forcibly injected into the negative impression of channel plate 21. Because injection molded manifold 22 occupies the space of the manifold impression, the molten elastomer is contained within the impression of channel plate 21. The impression of channel plate 21 can include one or more protrusions 21a (see FIG. 6) which extend into recesses of manifold 22 so that channel plate 21 and manifold 22 intertwine. Because the impression of elastomer channel plate 21 intertwines with the impression of plastic manifold 22, elastomer channel plate 21 is securely attached to manifold 22 when the molten elastomer is cooled and the mold is split open. Thus, elastomer channel plate 21 is injection molded into injection molded manifold 22. With double injection molding, printhead modules suitable for use in carriage type or full-width staggered array type printers can be fabricated.

The specific shape of the mold used to fabricate the chanifold will vary with the shape of the manifold and channel plate being formed, which primarily depends on the type of printer in which the printhead is to be used.

Figure 6A:
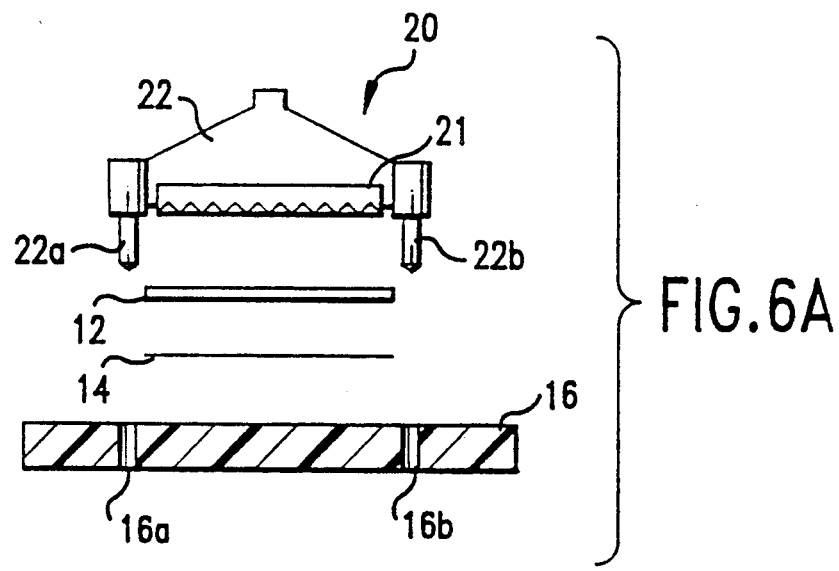
FIGS. 6A and 6B are front views of a printhead fabricated from a chanifold according to one embodiment of the present invention, FIG. 6A being an exploded view of the printhead.
Figure 6B:
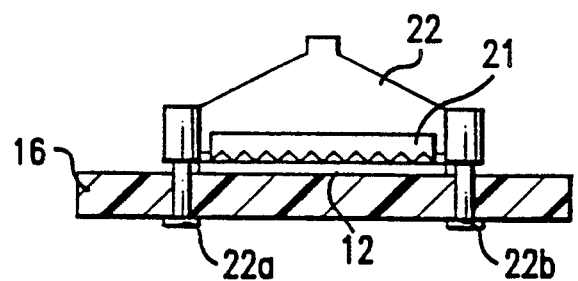

FIGS. 6A, 6B and 7 illustrate a thermal ink jet printhead and a process for fabricating the thermal ink jet printhead according to one embodiment of the present invention. After ink manifold 22 having elastomer channel plate 21 is injection molded (S101) and a silicon wafer containing plural heater plates 12 is fabricated, diced, cleaned, and the heater plates are separated from the diced wafer (S102-S105), a heater plate 12 is adhesively bonded to heat sink 16 (S106-S108) using, for example, silver epoxy 14. A PWB is attached to the heat sink and wire-bonded to heater plate 12 (S109-S110). The fabrication process is completed by inserting posts 22a, 22b located at each end of manifold 22 into apertures 16a, 16b formed in heat sink 16, and then melting the ends of posts 22a, 22b so that chanifold 20 is attached to heat sink 16 (S111-S113). Heater plate 12 is clamped between heat sink 16 and channel plate 21. When channel plate 21 is made from an elastomer, a fluid tight seal is made between channel plate 21 and heater plate 12 so that no adhesives are required.

Figure 8:
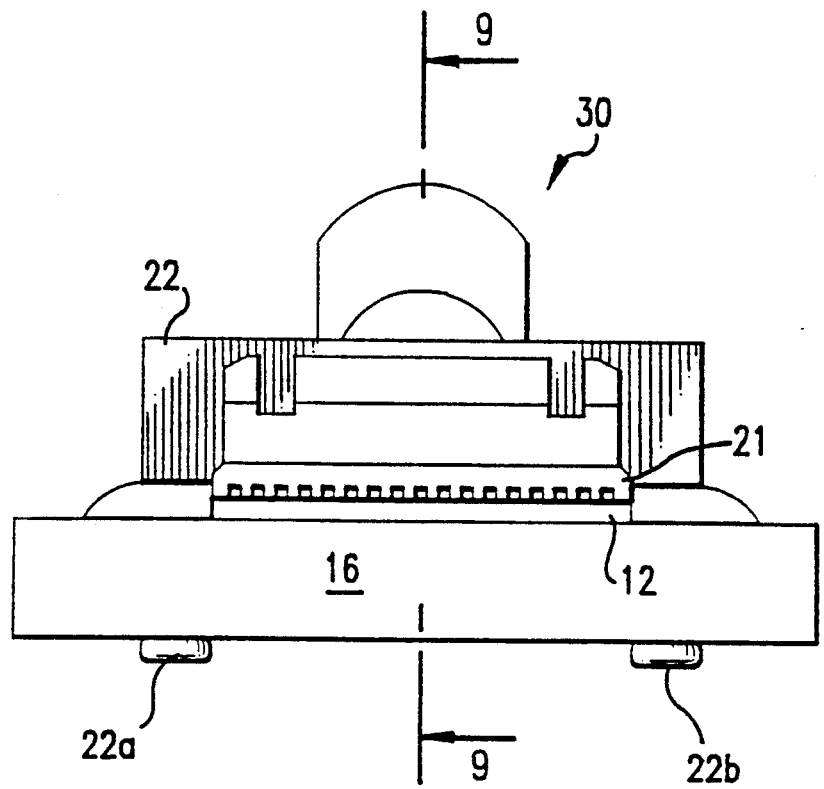
FIG. 8 is a front view of a thermal ink jet printhead having a chanifold according to an embodiment of the present invention.
Figure 9:
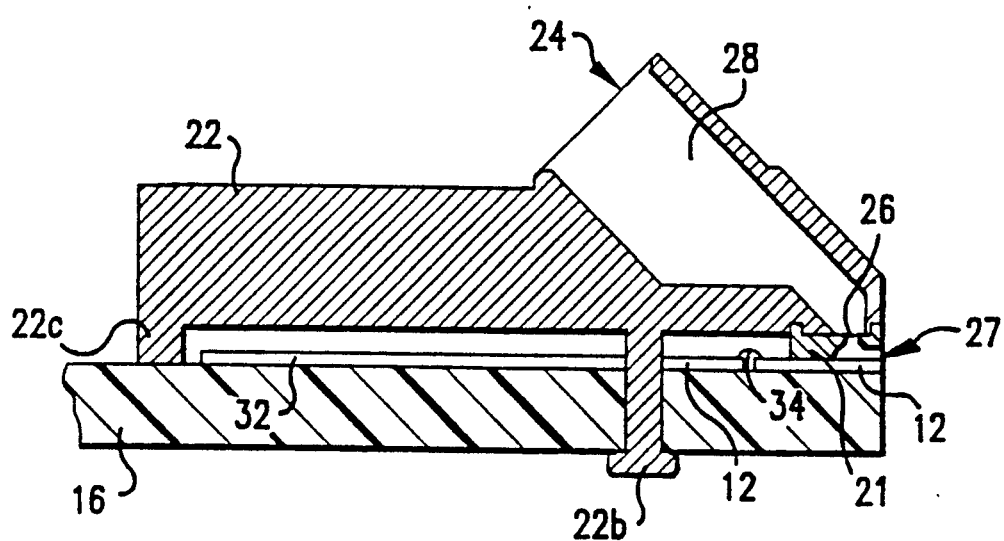
FIG. 9 is a cross-sectional view of the FIG. 8 thermal ink jet printhead along the line 9—9 of FIG. 8.

FIGS. 8 and 9 illustrate various views of the completed thermal ink jet printhead 30. As shown in FIG. 9, heater plate 12 is connected to a Printed Wire Board (PWB) 32 for controlling the heating elements on heater plate 12 using wires 34. PWB 32 is located in a space formed between manifold 22 and heat sink 16. Post 22c helps to maintain this space and acts as a stabilizing support for the chanifold.

As shown in FIG. 8, nozzles 27 are substantially rectangular in shape. Nozzles having a triangular shape, or other shapes are also possible. In addition, channels with non uniform profiles can be formed (e.g., the ink channel input can have a different cross-section than the ink channel output).

In comparison with the previous fabrication method, the number of steps required to form the thermal ink jet printhead is substantially less. Because of the reduced number of steps, assembly time, and fabrication costs are also reduced. Moreover, because epoxy 13 and RTV sealant 19 are eliminated from the fabrication process, the process yield of the thermal ink jet printhead increases because there is less likelihood that the channels of the channel plate will be clogged by the epoxy and the RTV sealant during the bonding of the heater plate and manifold, respectively.

With the above manifold having an elastomer channel plate and the method of making thereof, the number of steps to fabricate the thermal ink jet printhead is reduced. Further, expensive semiconductor wafers need not be used to fabricate the channel plate of the thermal ink jet printhead. Moreover, the channel and heater plate are attached to each other without the use of adhesives. Additionally, it can be appreciated that the elastomer channel plate may be formed so that a lowermost surface of the channel plate is completely flush with a lowermost surface of the manifold.

Figure 10:
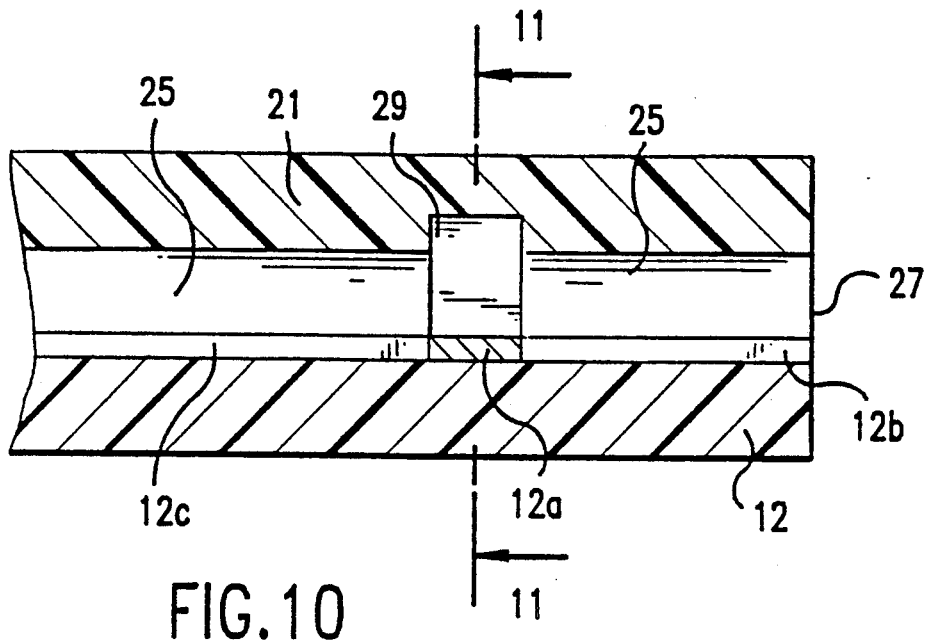
FIG. 10 is a cross-sectional view of a modified channel plate having a pit feature.
Figure 11:
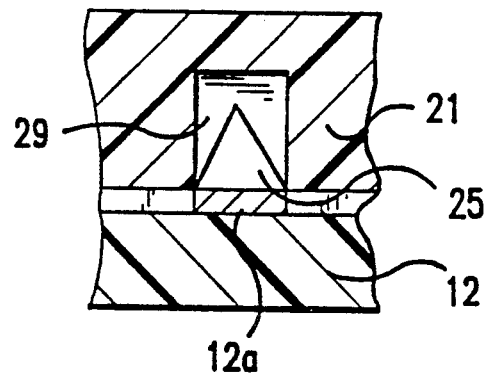
FIG. 11 is a cross-sectional view along line 11—11 in FIG. 10.

FIGS. 10 and 11 are cross-sectional views of a channel plate according to a further modification of the invention after being attached to a heater plate. The channel plate 21 in FIGS. 10 and 11 can be made integrally with a manifold, or can be made separate therefrom by a one step injection molding process. The channel plate 21 in FIGS. 10 and 11 is preferably made from an elastomeric material when made with a manifold, but could also be made from non-elastomeric material such as ceramic Green Tape as discussed in the above-referenced U.S. patent application Ser. No. 07/789,490 if not made integrally with a manifold.

Figure 2:
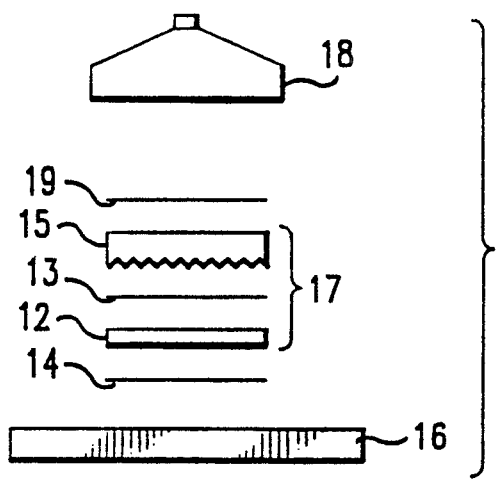
FIG. 2 is an exploded front view of a conventional thermal ink jet printhead mounted on a heat sink.

The channel plate 21 in FIGS. 10 and 11 differs from the previously described channel plate in that a pit 29 is formed in each channel 25 of channel plate 21. Pit 29 is located in the portion of channel 25 which corresponds to the heater element 12a on heater plate 12. The provision of pit 29 eliminates the need to provide a pit in polyimide protective layer 12b, which is provided on an upper surface of heater plate 12 to protect the circuitry 12c thereon from the corrosive effects of ink in channels 25. This enables polyimide layer 12b to be formed as a much thinner layer. For an example of conventional pits formed in a polyimide protective layer, see FIG. 2 of U.S. Pat. No. 4,774,530 to Hawkins.

In addition to saving polyimide, formation of pits 29 in channel plate 21 saves time, improves heater wafer yield (the current process to form the polyimide layer is expensive due to the rigid tolerances imposed upon the process), and reduces the total number of process steps. Also, pit geometry changes, e.g. side wall profile and cavity shape, impossible to implement in polyimide, can now be produced.

The present invention is also applicable to ink jet printers which use means other than heat to expel droplets through nozzles.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A two step injection molding process for fabricating a combined manifold and channel plate for use in ink jet printheads, comprising:

a) injection molding a manifold having an inlet, an outlet and a passage connecting said inlet and outlet; and b) injection molding in said manifold, a channel plate having a plurality of channels and a reservoir communicating with said plurality of channels and said manifold outlet, said manifold and said channel plate being injection molded from materials having different physical properties.

2. The process of claim 1, wherein said manifold is injection molded using a hard plastic material.

3. The process of claim 2, wherein said channel plate is injection molded using an elastomer material.

4. The process of claim 1, wherein said channel plate is injection molded using an elastomer material.

5. A process for fabricating a thermal ink jet printhead comprising the steps of:
   a) injection molding a manifold having an inlet, an outlet and a passage connecting said inlet and outlet;
   b) injection molding in said manifold a channel plate having a plurality of channels and a reservoir communicating with said plurality of channels and said manifold outlet;
   c) bonding a heater plate having a plurality of heater elements corresponding in number and location to the plurality of channels to a heat sink; and
   d) securing said manifold to said heat sink so that the heater elements on said heater plate are located in corresponding channels in said channel plate to form a plurality of nozzles for the thermal ink jet printhead.

6. The process of claim 5, wherein said manifold is injection molded using a hard plastic material.

7. The process of claim 5, wherein said channel plate is injection molded using an elastomeric material.

8. The process of claim 5, wherein said step of securing said manifold to said heat sink comprises:
   inserting two posts located at opposite ends of said manifold into apertures formed in said heat sink; and
   securing said two posts to said apertures.

* * * * *